(12) United States Patent (10) Patent No.: US 9,142,140 B2
Pope (45) Date of Patent: Sep. 22, 2015

(54) MUSCLE MEMORY TRAINING DEVICE

(71) Applicant: Shawn Patrick Pope, Belle, MO (US)

(72) Inventor: Shawn Patrick Pope, Belle, MO (US)

( * ) Notice: Subject to any disclaimer, the term of this patent is extended or adjusted under 35 U.S.C. 154(b) by 103 days.

(21) Appl. No.: 14/020,885

(22) Filed: Sep. 8, 2013

(65) Prior Publication Data

US 2015/0072325 A1 Mar. 12, 2015

(51) Int. Cl.
*A63B 69/36* (2006.01)
*G09B 19/00* (2006.01)

(52) U.S. Cl.
CPC .................................. *G09B 19/0038* (2013.01)

(58) Field of Classification Search
USPC .......... 473/201, 202, 205, 207, 212, 257, 276
See application file for complete search history.

(56) References Cited

U.S. PATENT DOCUMENTS

| 5,509,809 | A | * | 4/1996 | Clay | 434/252 |
| 5,827,126 | A | * | 10/1998 | Lee | 473/213 |
| 5,895,326 | A | * | 4/1999 | Cozza et al. | 473/213 |
| 7,775,898 | B1 | * | 8/2010 | Allen | 473/214 |

* cited by examiner

*Primary Examiner* — Nini Legesse
(74) *Attorney, Agent, or Firm* — Carrier Blackman & Associates, P.C.; William D. Blackman; Joseph P. Carrier (57) ABSTRACT

A muscle memory training device for attaching to a joint of a user, such as, for example, a wrist joint. The training device includes a pair of opposing circuit boards for overlying first and second elements of the joint. The pair of circuit boards are pivotally connected with a pivot point configured to be placed over the joint. The circuit boards include individual contact traces which are configured and arranged such that when said traces are rotated past each other, the traces sequentially complete one of a sequence of circuits, providing a signal at each one of a plurality of contact positions depending on opposing circuit board rotation positions. In this manner, sensory input is provided to a user while practicing a movement.

7 Claims, 10 Drawing Sheets

MUSCLE MEMORY TRAINING DEVICE

BACKGROUND OF THE INVENTION

1. Field of the Invention

The present invention relates to a training device which provides sensory input to a user for tracking wrist to hand position while practicing a movement.

2. Brief Description of the Prior Art

In sports there is a theory that a movement must be done 1000 times before it is "muscle memory" and becomes the subconscious way the body performs that movement. Success in many sports requires a specific wrist to hand position and tempo.

What is needed is a training device which provides sensory input to a user by tracking wrist to hand position and tempo coupled with real-time visual feedback such that a user may develop "muscle memory" by practicing successful movements. A user may thus coach himself.

SUMMARY OF THE INVENTION in view of the above, it is an object of the present invention to provide a training device which is useful in practicing a joint movement and developing muscle memory such that the movement becomes subconscious.

More particularly, it is an object to provide a training aid that creates clearly defined muscle memory through consistent and repetitious training exercises involving sensory input in a real-time environment.

It is another object to provide a training device useful in perfecting a golf swing without a coach.

Other objects and features of the invention will be in part apparent and in part pointed out hereinafter.

In accordance with the invention, a training aid is provided for signaling the angular relationship between components of a user's joint (such as the back of the hand and a forearm) for regarding the result of the movement and thus developing muscle memory to the correct movement.

The invention summarized above comprises the constructions hereinafter described, the scope of the invention being indicated by the subjoined claim. For a more complete understanding of the present invention, the reader is referred to the following detailed description section, which should be read in conjunction with the accompanying drawings.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF ILLUSTRATIVE EMBODIMENTS

Descriptions will be provided below of selected illustrative embodiments of the present invention on a basis of illustrative examples of the present invention, supported by and shown in the accompanying drawings. It should be understood that only structures considered necessary for clarifying the present invention are described herein. Other conventional structures, and those of ancillary and auxiliary components of the system, will be known and understood to those skilled in the art.

Referring to the drawings more particularly by reference character, a training device 10 in accordance with the present invention includes a pair of circuit boards 12, 14 with individual contact traces 16, 18 which when rotated past each other complete a circuit providing a signal at varying contact positions depending on opposing circuit board rotation positions.

As particularly described below, while training device 10 is designed with the sport of golf in mind, it is not limited to that sport, Further, while training device 10 is illustrate with respect to a wrist joint, training device 10 may be attached to the elbow, knee or any joint involving motion.

Figure 5A:
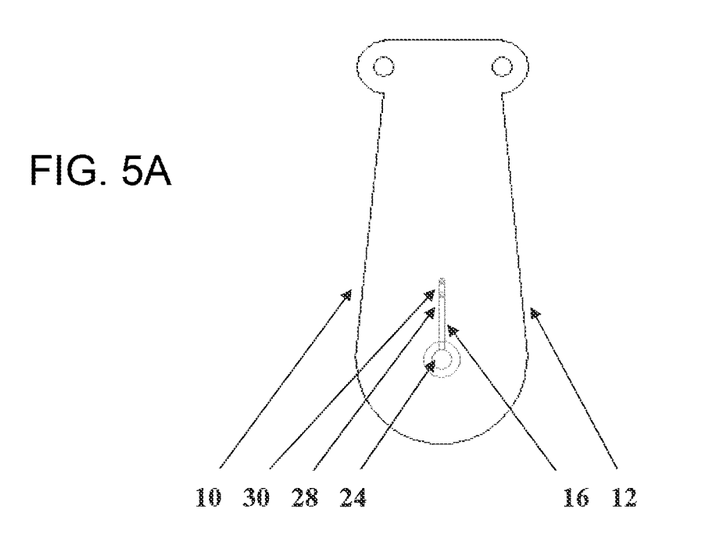
FIG. 5A shows a first one of a pair of circuit boards before they are joined together with a pivot.
Figure 5B:
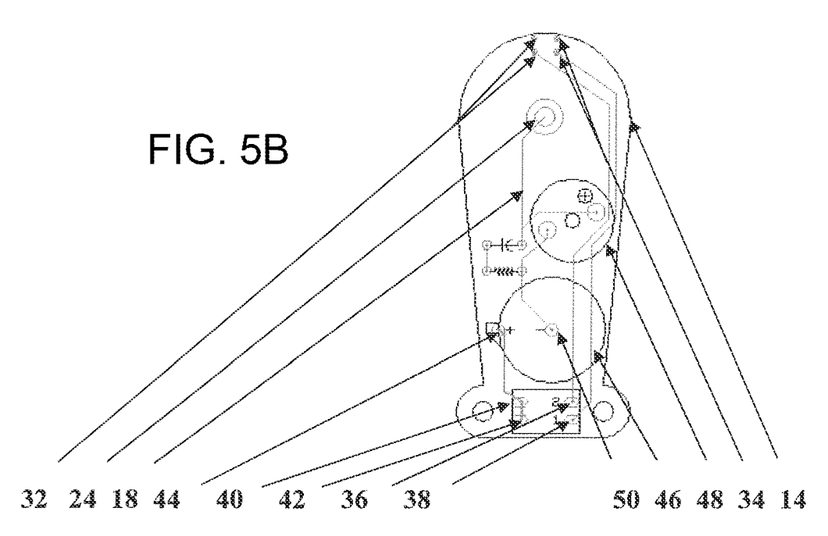
FIG. 5B shows a second one of the pair of circuit boards.
Figure 6:
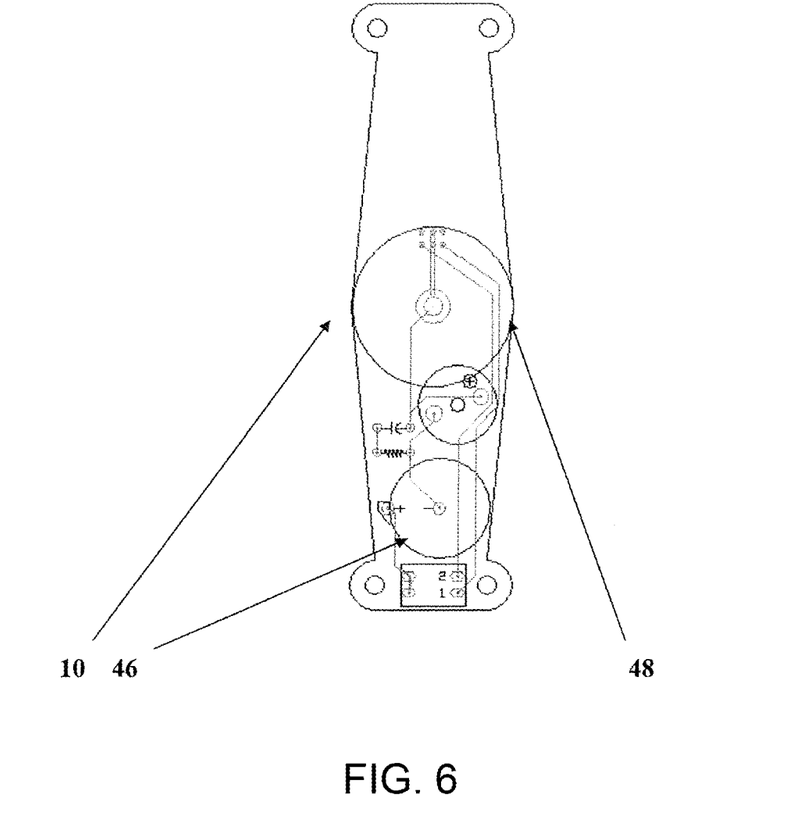
FIG. 6 shows the circuit boards of FIGS. 5A-5B joined together with a pivot.
Figure 7A:
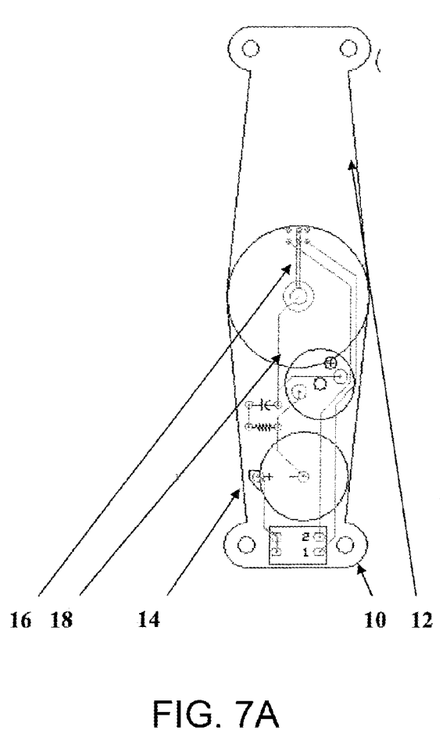
FIG. 7A through FIG. 7E are sequential views Showing a series of steps in the rotational relationship of the circuit boards through a golf swing cycle.
Figure 7B:
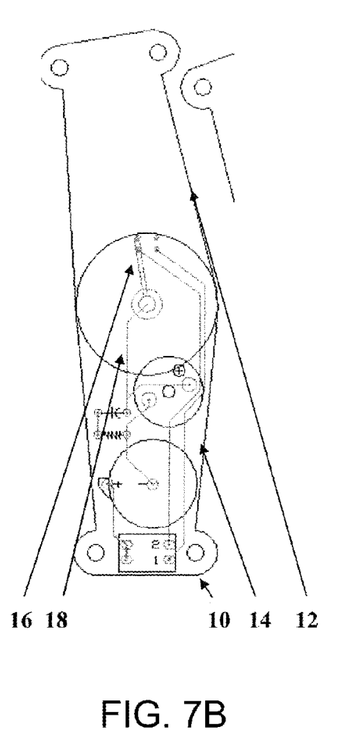
Figure 7C:
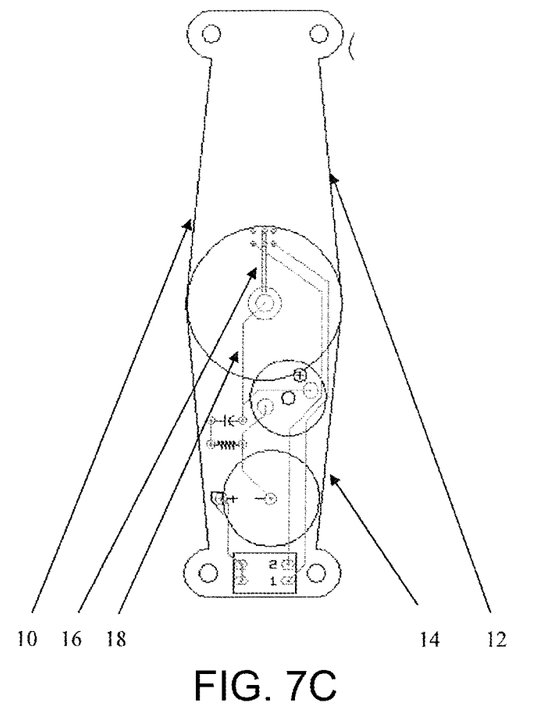
Figure 7D:
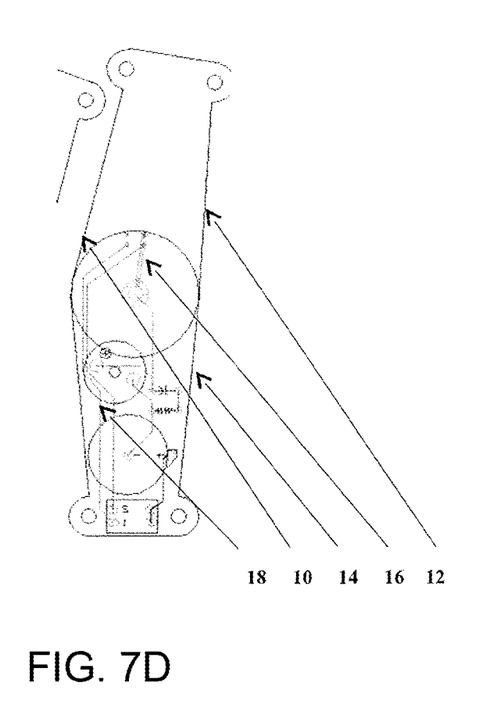
Figure 7E:
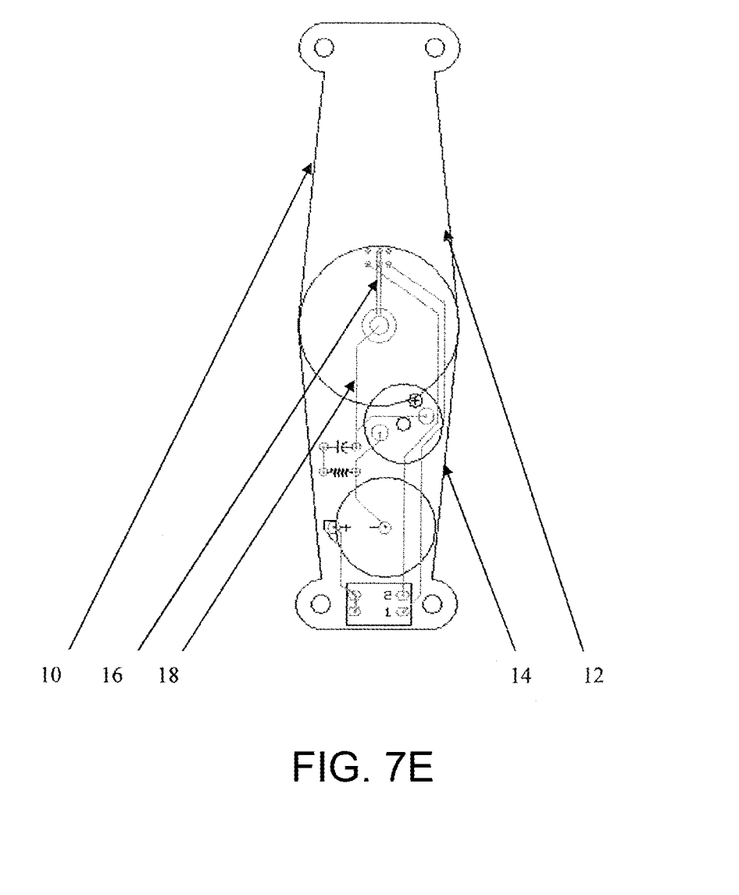

As shown in FIGS. 1A-1C and FIGS. 2A-2C, for a successful golf swing, a backhand 20 must remain in line with a forearm 22 of the lead arm. The wrist, however, must cock, first in one direction and then in the other direction. Training device 10 as shown in FIGS. 5 and 6 accommodates this action and may provide a series of signals, such as auditory signals, as first circuit board 12 is cocked first in one direction, passes through a center position where a golfball is struck and is cocked in a second direction on completion of the swing. The time interval between the signals provides the user with tempo information. By visually following the ball, the user is given real-time feedback as to whether the movement was proper.

Figure 3:
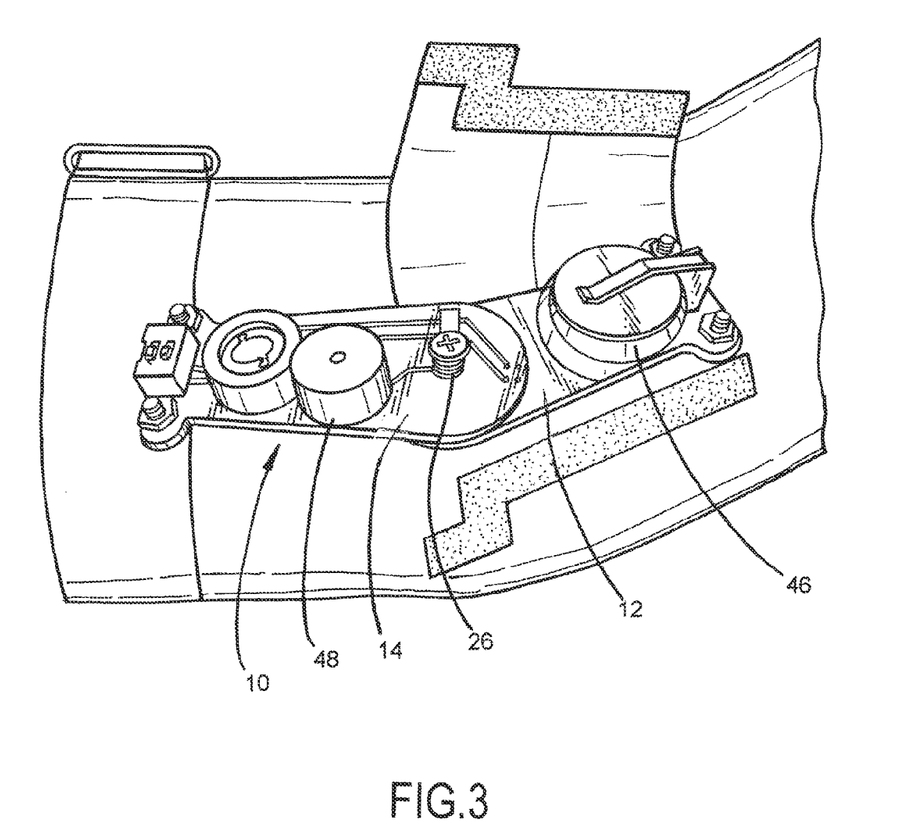
FIG. 3 shows a pair of circuit boards being flexed when a user's backhand is cupped backwardly.

Turning to FIGS. 5 and 6, first and second circuit boards 12, 14 are elongated with a lower end of first circuit board 12 pivotally connected via pivot 24 to an upper end of second circuit board 14. It will be understood that the designation first and second circuit boards is arbitrary and may be reversed. Pivot 24 as shown in FIGS. 3 and 4 may be biased by a spring 26 such that first and second circuit boards 12, 14 may be bent backwardly as shown in FIG. 3 to accommodate slight backhand cupping without breaking the circuit formed between the boards.

Figure 4:
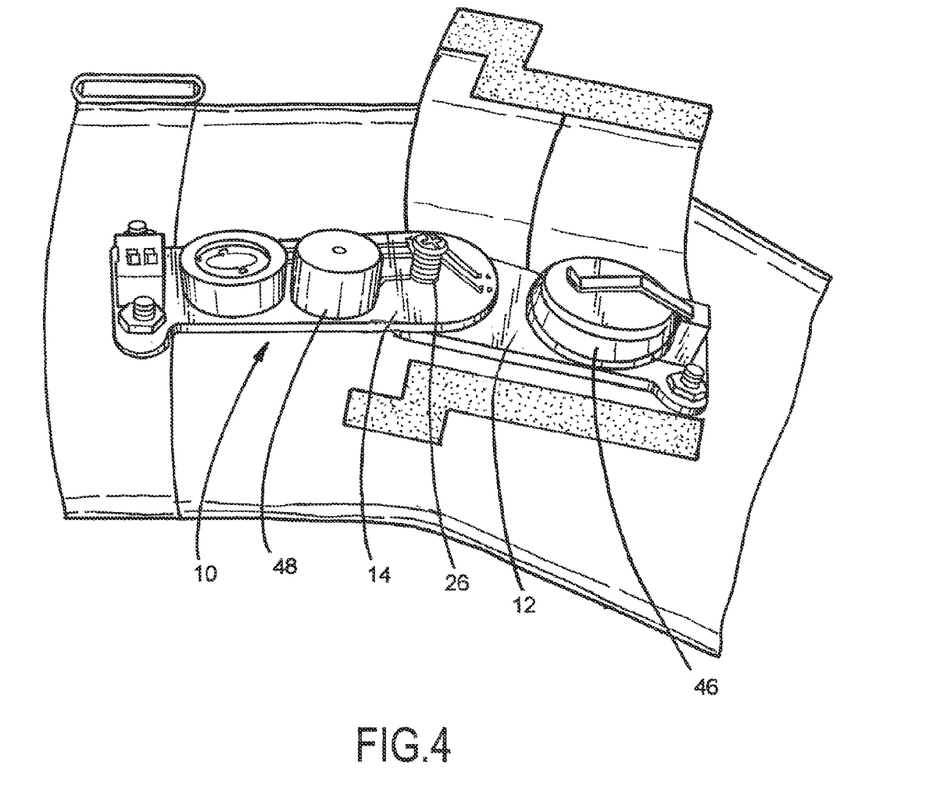
FIG. 4 shows a pair of circuit boards being flexed when a user's backhand is folded downwardly.

In other sports, as shown in FIG. 4, backhand folding may be important and breaking of the circuit significant. In golf, breaking the circuit alerts the user to improper hand position.

FIGS. SA-5B show first and second circuit boards 12, 14 separated. As shown in FIG. 5A, trace 16 in first circuit board 12 includes a wire 28 connected to pivot 24 with a support 30. Second circuit board 14 as shown in FIG. 5B has a pair of first contacts 32 and pair of second contacts 34 which are closed by wire 28 on first circuit board 12 at different pivot points as more particularly described.

With continuing reference to FIG. 5B, the second circuit board includes a first switch 36 having a first and second side and a second switch 38 having a first and second side. In trace 18 one of the first contacts 32 is connected to the first side of a first switch 36 and one of second contacts 34 is connected to the first side of a second switch 38. The second sides 40, 42 of first and second switches 36, 38, respectively, are connected to one pole 44 of a battery 46. Pivot 24 on second circuit board 14 is connected through a buzzer 48 (or other signaling device) to a second pole 50 of battery 46.

Figure 1A:
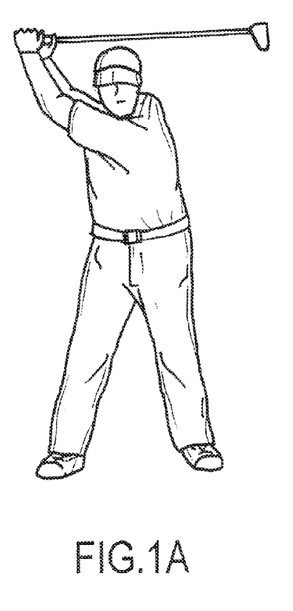
FIG. 1A illustrates a user making a golf stroke at a top of the swing.
Figure 1B:
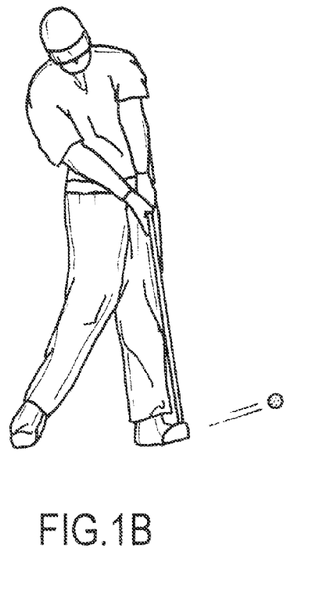
FIG. 1B illustrates a user making a golf stroke at a time of impact.
Figure 1C:
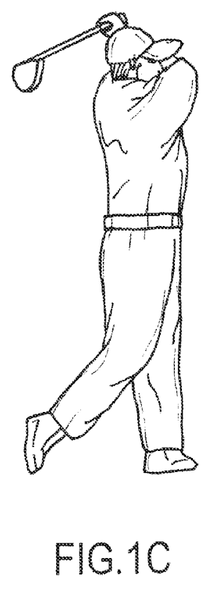
FIG. 1C illustrates a user making a golf stroke at a time of finishing the stroke.
Figure 2A:
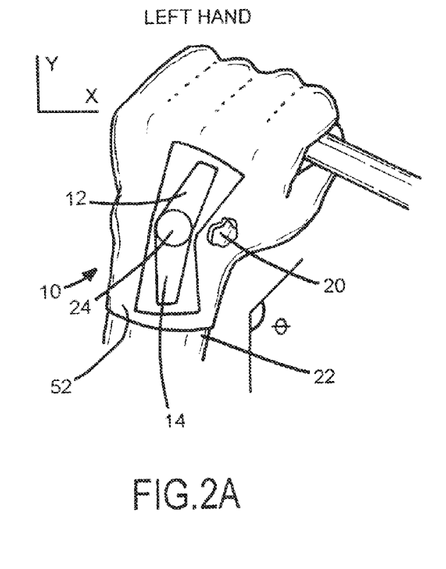
FIG. 2A shows the position of the wrist joint between a golfer's hand and forearm at the top of a swing.
Figure 2B:
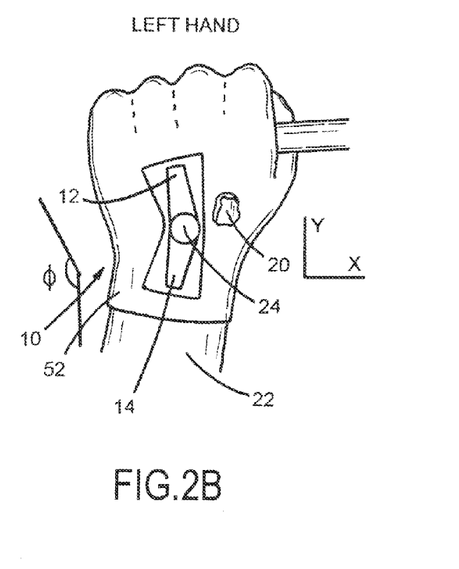
FIG. 2B shows the position of the wrist joint between a golfer's hand and forearm just before the time of impact.
Figure 2C:
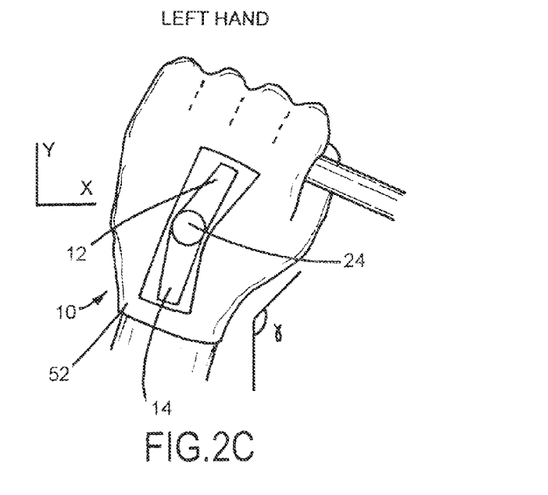
FIG. 2C shows the position of the wrist joint between a golfer's hand and forearm on finish.

For example, a golf swing cycle is shown in FIGS. 7A through 7E. Beginning with FIG. 7A, circuit boards 12, 14 are shown in a beginning position. With switches 36, 38 on, wire 28 does not connect either of first or second contacts 32, 34 and buzzer 48 is not sounded. On the backswing as shown in FIG. 1A. circuit boards 12, 14 rotate such that wire 28 connects to at least one of first contacts 32 closing the circuit and sounding buzzer 48 for a first time. On the downswing as shown in FIG. 7E, again wire 28 does not connect either of first or second contacts 32, 34 and buzzer 48 is not sounded. On the finish stroke as shown in FIG. 1C, circuit boards 12, 14 rotate such that wire 28 connects to at least one of second contacts 34, closing the circuit and sounding buzzer 48 for a second time. The time difference between the first and second soundings of buzzer 48 provides the golfer information regarding the tempo of his or her stroke.

It will be understood, that the positioning of first and second contacts 32, 34 may he such that buzzer 48 is sounded at different points in the stroke other than or in addition to those discussed above and that additional contacts may be provided. For example, buzzer 48 may be sounded at half swing, top of the swing, pre-impact, post-impact, half swing, finish, etc.

Training aid 10 is preferably positioned on the user's lead hand such that one of circuit boards 12, 14 is positioned over the user's backhand 20 and the other of circuit boards 12, 14 is positioned over the user's forearm 22 with pivot 24 positioned over the wrist. Training aid 10 may be strapped to the user's joint or imbedded in a golf glove 52, knee brace or the like.

In use first and second circuit boards 12, 14 lie in parallel planes with pivot 24 and training device 10 signals the angular relationship between the user's forearm 22 and backhand 20. When one of the circuit boards is rotated with respect to the other, the first and second contact traces 16, 18 close a circuit and emit a signal when the user's wrist is cocked in a firs direction and a second signal when cocked in a second direction. Additional auditory signals may be provided. The time interval between signals indicates the speed of the swing, while by following the result of the movement the user is given real-time feedback such that he or she may make corrections immediately in the next movement practiced.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A muscle memory training device for attaching to a joint of a user, said training device comprising a pair of opposing circuit boards for overlying first and second elements of the joint, said pair of circuit boards pivotally connected with a pivot point configured to be placed over the joint, each of said said circuit boards comprising individual contact traces which are configured and arranged such that, when said traces are rotated past each other, said traces sequentially complete a sequence of circuits, providing a signal at each one of a plurality of contact positions depending on opposing circuit board rotation positions, whereby sensory input is provided to a user while practicing a movement.

2. The muscle memory training device according to claim 1, wherein:
the pair of opposing circuit boards comprises a first circuit board and a second circuit board,
the contact traces on the first circuit board comprise a metal wire,
the contact traces on the second circuit board comprise a plurality of pairs of contacts for completing one of said circuits, and
one of said circuits is completed when the metal wire on the first circuit board connects to at least one of the contacts in one of the pairs of contacts on the second circuit board.

3. The muscle memory training device according to claim 2, wherein:
the second circuit board further comprises a first switch, a second switch, a pivot, a battery, and a buzzer,
the plurality of pairs of contacts comprises a first and second pair of contacts, wherein:
one of the first pair of contacts is connected to the first side of the first switch,
one of the second pair of contacts is connected to the first side of the second switch,
the second sides of the first and second switches are connected to one pole of a battery,
the pivot is connected to the other pole of a battery,
when the first switch is closed, and the metal wire of the first circuit board is rotated such that it connects to at least one of the first pair of contacts on the second circuit board, one of said circuits including the battery and buzzer is completed, and the buzzer provides an auditory signal to the user,
when the second switch is closed and the metal wire of the first circuit board is rotated such that it connects to at least one of the second pair of contacts on the second circuit board, another of the said circuits including the battery and buzzer is completed, and the buzzer provides an auditory signal to the user and
when the metal wire of the first circuit board is rotated such that it does not connect any of the pairs of contacts on the second circuit board, no circuit is completed and the buzzer is off.

4. The muscle memory training device according to claim 1, wherein when the pivot is biased by backhand folding, the traces will not complete a circuit when said traces are rotated past each other.

5. A muscle memory training device for attaching to a joint of a user, said training device, comprising:
a first circuit board, said first circuit board comprising a wire, and a pivot, and wherein the wire is electrically connected to the pivot,
a second circuit board, said second board comprising:
a first pair of contacts,
a second pair of contacts,
a first switch having a first side and a second side,
a second switch having a first side and a second side,
a battery having a first pole and a second pole,
a buzzer, and a pivot which is pivotally connected to the first circuit board, wherein:

one of the first pair of contacts is connected to a first side of the first switch, one of the second pair of contacts is connected to a first side of the second switch, the second sides of the first and second switches are connected to the first pole of the battery, the pivot is electrically connected to the second pole of the battery, when the first switch is closed, and the metal wire of the first circuit board is rotated such that it connects at least on of the first pair of contacts on the second circuit board, a first circuit including the battery and buzzer is completed, and the buzzer provides an auditory signal to the user, when the second switch is closed and the metal wire of the first circuit board is rotated such that it connects at least one of the second pair of contacts on the second circuit board, a second circuit including the battery and buzzer is completed, and the buzzer provides an auditory signal to the user and when the metal wire of the first circuit board is rotated such that it does not connect any of the pairs of contacts on the second circuit hoard, no circuit is completed and the buzzer is off.

6. The muscle memory training device according to claim 5, wherein the first circuit can he deactivated by putting the first switch in an off position.

7. The muscle memory training device according to claim 5, wherein the second circuit can be deactivated by putting the second switch in an off position.

* * * * *